United States Patent
Fujita et al.

(10) Patent No.: US 10,161,015 B2
(45) Date of Patent: Dec. 25, 2018

(54) HEAT TREATMENT METHOD AND METHOD OF MANUFACTURING MACHINE PART

(71) Applicant: NTN Corporation, Osaka-shi, Osaka (JP)

(72) Inventors: Takumi Fujita, Kuwana (JP); Kazuhiro Yagita, Kuwana (JP)

(73) Assignee: NTN CORPORATION, Osaka (JP)

( * ) Notice: Subject to any disclaimer, the term of this patent is extended or adjusted under 35 U.S.C. 154(b) by 551 days.

(21) Appl. No.: 14/440,073

(22) PCT Filed: Oct. 2, 2013

(86) PCT No.: PCT/JP2013/076784
§ 371 (c)(1),
(2) Date: Apr. 30, 2015

(87) PCT Pub. No.: WO2014/069149
PCT Pub. Date: May 8, 2014

(65) Prior Publication Data
US 2015/0315669 A1 Nov. 5, 2015

(30) Foreign Application Priority Data
Oct. 31, 2012 (JP) ................................. 2012-240401

(51) Int. Cl.
*C21D 1/18* (2006.01)
*C21D 11/00* (2006.01)
(Continued)

(52) U.S. Cl.
CPC ................ *C21D 11/00* (2013.01); *C21D 1/10* (2013.01); *C21D 1/18* (2013.01); *C21D 1/42* (2013.01);
(Continued)

(58) Field of Classification Search
CPC . C21D 11/00; C21D 1/18; C21D 1/74; C21D 1/42
See application file for complete search history.

(56) References Cited

U.S. PATENT DOCUMENTS

| 2006/0213588 A1 | 9/2006 | Fujita et al. |
| 2008/0073003 A1 | 3/2008 | Fujita et al. |

(Continued)

FOREIGN PATENT DOCUMENTS

| CN | 101048517 A | 10/2007 |
| EP | 1808499 A1 | 7/2007 |

(Continued)

OTHER PUBLICATIONS

Chinese Office Action dated May 20, 2016 issued in Chinese Patent Application No. 201380068764.8 (English translation).
(Continued)

*Primary Examiner* — Jessee R Roe

(57) ABSTRACT

A heat treatment method includes the steps of: measuring a hot section temperature; measuring a cold section temperature; adjusting a temperature of a workpiece; and determining quenching timing for the workpiece. The step of adjusting a temperature includes the steps of: heating the workpiece by high energy heating; and controlling heating based on the hot section temperature. In the step of determining quenching timing, the quenching timing is determined based on the hot section temperature and the cold section temperature so as to achieve a predetermined solid-dissolved state of carbon on a TTA diagram in the entire workpiece. The TTA diagram is derived by a calculation formula obtained by conducting a regression analysis of a result of an experiment performed for examining a relation between the solid-dissolved state of carbon and each of a heating temperature and a heating time of steel.

8 Claims, 5 Drawing Sheets

(51) Int. Cl.
| | | |
|---|---|---|
| *C21D 1/74* | (2006.01) | |
| *C21D 1/42* | (2006.01) | |
| *C22C 38/00* | (2006.01) | |
| *C21D 9/40* | (2006.01) | |
| *C21D 1/10* | (2006.01) | |

(52) U.S. Cl.
CPC .............. *C21D 1/74* (2013.01); *C21D 9/40* (2013.01); *C22C 38/00* (2013.01); *Y02P 10/253* (2015.11)

(56) References Cited

U.S. PATENT DOCUMENTS

| 2012/0024839 A1 | 2/2012 | Fujita et al. |
| 2013/0301969 A1 | 11/2013 | Yuki et al. |

FOREIGN PATENT DOCUMENTS

| JP | 2006-124791 A | 5/2006 |
| JP | 2006-152430 A | 6/2006 |
| JP | 2006-291248 A | 10/2006 |
| JP | 2007-239039 A | 9/2007 |
| WO | 2006/030686 A1 | 3/2006 |
| WO | 2007/102306 A1 | 9/2007 |
| WO | 2012/098988 A1 | 7/2012 |

OTHER PUBLICATIONS

Extended European Search Report dated Jun. 1, 2016 issued in European Patent Application No. 13852133.1.
International Search Report issued International Application No. PCT/JP2013/076784 dated Jan. 7, 2014, with English Translation.

HEAT TREATMENT METHOD AND METHOD OF MANUFACTURING MACHINE PART

RELATED APPLICATIONS

This application is a national phase of International Application No. PCT/JP2013/076784, filed on Oct. 2, 2013, which in turn claims the benefit of Japanese Application No. 2012-240401, filed on Oct. 31, 2012, the disclosures of which Applications are incorporated by reference herein.

TECHNICAL FIELD

The present invention relates to a heat treatment method and a method of manufacturing a machine part, and more particularly to a heat treatment method of quench-hardening a workpiece made of steel and a method of manufacturing a machine part using the heat treatment method.

BACKGROUND ART

A high-energy heat treatment for a workpiece made of steel, such as a high-frequency induction heat treatment, a laser heat treatment, an electron-beam heat treatment and a flame heat treatment, is carried out by directly heating a workpiece, and therefore, has advantages that, for example, relatively high energy efficiency may be able to be achieved as compared with a heat treatment conducted using an atmosphere heating furnace that heats a workpiece through an atmosphere. For example, according to the high-frequency induction heat treatment, a working environment is clean and a relatively small lot of products can be efficiently processed in a short time, as compared with the heat treatment using an atmosphere heating furnace. In high-frequency quenching of steel, generally, by repeating the procedure of heat-treating a test piece while changing a transition of electric power (electric power pattern) with respect to passage of time and checking the quality of the heat-treated test piece, the electric power pattern (heating condition) is set in a trial-and-error manner. In this case, the electric power pattern defined as a heat treatment condition needs to be set each time in accordance with the type (material and shape) of the workpiece. This poses a problem that time and efforts are required for determining the heat treatment condition.

Furthermore, the high-energy heat treatment including a high-frequency induction heat treatment is carried out as partial heating by which a part of a workpiece is heated, with the result that temperature unevenness occurs within the workpiece. Accordingly, when performing a heat treatment such as immersion quenching for heat-treating an entire workpiece, quality unevenness may occur within the workpiece. Particularly, in such a workpiece as having a relatively large thickness, temperature unevenness is more likely to increase, which may lead to a problem that desired quality cannot be achieved in some parts of the workpiece.

In this way, in the case where the entire workpiece is heat-treated, for example, immersion-quenched, by means of a high-energy heat treatment, there occur problems that time and efforts are required for determining the heat treatment condition and also that the heat treatment quality becomes uneven.

In response, there has been a proposed method of suppressing unevenness of the heat treatment quality while reducing the time and efforts for determining the condition by automatically determining the heat treatment condition (for example, see Japanese Patent Laying-Open No. 2006-152430 (PTD 1)). The method disclosed in PTD 1 is implemented by simultaneously measuring the temperature of a region of a workpiece in which the temperature is more likely to rise during high-frequency induction heating and the temperature of a region of the workpiece in which the temperature is less likely to rise during high-frequency induction heating; determining in real time during heating based on the measured temperature data whether the predetermined heat treatment quality is achieved or not in both of these regions; and setting the heat treatment quality of the entire workpiece to a predetermined level. Also, in the method disclosed in PTD 1, it is determined by prediction according to the following formula (A) whether the predetermined heat treatment quality is achieved or not in the entire workpiece.

$$\partial C/(\partial t)=D\partial^2 C/(\partial x^2) \tag{A}$$

where D: diffusion constant, C: carbon concentration (mass %), t: time (second), x: distance, $D=D_0\exp(-Q/RT)$ where $D_0$: entropy term of diffusion constant, Q: activation energy, R: gas constant, and T: absolute temperature (K).

CITATION LIST

Patent Document

PTD 1: Japanese Patent Laying-Open No. 2006-152430

SUMMARY OF INVENTION

Technical Problem

A calculation model is required for calculating the distribution of the amount of carbon solid-dissolved in steel using the above-described formula (A). The calculation model employed in PTD 1 is a simple model in which carbon is diffused from two carbides while being solid-dissolved in a base material. This model aims to approximately calculate the behavior of solid dissolution of carbon during heating. In the case where such a heat treatment method is employed in the machine part manufacturing process and the like, however, it is desirable to improve the heat treatment method such that the heat treatment quality of a workpiece can be predicted with higher accuracy.

The present invention has been made in order to solve the above-described problems. An object of the present invention is to provide: a heat treatment method by which a workpiece made of steel can be more reliably provided with desired heat treatment quality in a quench-hardening process of the workpiece by improving the prediction accuracy of the heat treatment quality; and a method of manufacturing a machine part using the heat treatment method.

Solution to Problem

The heat treatment method according to the present invention is a high-energy heat treatment method of heating a surface layer of a workpiece made of steel for implementing quench-hardening. This heat treatment method includes the steps of: measuring a hot section temperature corresponding to a temperature of a portion in which the temperature rises most in the workpiece; measuring a cold section temperature corresponding to a temperature of a portion in which the temperature rises least in the workpiece; adjusting the temperature of the workpiece; and determining quenching timing for the workpiece.

The step of adjusting the temperature of the workpiece includes the steps of: heating the workpiece by high energy heating; and controlling heating of the workpiece by the high energy heating based on the hot section temperature. In the step of determining quenching timing for the workpiece, the quenching timing is determined based on the hot section temperature and the cold section temperature such that the steel forming the workpiece exhibits a predetermined solid-dissolved state of carbon on a TTA diagram in the entire workpiece. The TTA diagram is derived by a calculation formula obtained by conducting a regression analysis of a result of an experiment performed in advance for examining a relation between the solid-dissolved state of carbon in the steel and each of a heating temperature and a heating time of the steel.

According to the heat treatment of the present invention, in the step of adjusting the temperature of the workpiece, heating of the workpiece by high energy heating is controlled based on the hot section temperature. This allows suppression of defects such as coarsening of a crystal grain due to heating of a part of the workpiece to an elevated temperature more than necessary. Furthermore, according to the heat treatment of the present invention, in the step of determining quenching timing for the workpiece, the quenching timing is determined based on both of the hot section temperature and the cold section temperature such that the steel forming the workpiece exhibits a predetermined solid-dissolved state of carbon on a TTA diagram in the entire workpiece. Accordingly, the desired heat treatment quality is achieved in the entire workpiece. Also, the TTA diagram is derived by a calculation formula obtained by conducting a regression analysis of a result of an experiment performed in advance for examining the relation between the solid-dissolved state of carbon in steel of the same kind as the steel forming the workpiece and each of a heating temperature and a heating time of the steel. Thereby, the material quality can be predicted with high accuracy as compared with the conventional method of approximately calculating the distribution of the amount of carbon solid-dissolved in steel based on a simple calculation model. As described above, according to the heat treatment method of the present invention, the workpiece made of steel can be more reliably provided with desired heat treatment quality in the quench-hardening process of the workpiece by improving the prediction accuracy of the heat treatment quality.

In the present application, the term "high energy heating" means heating including high-frequency induction heating, laser heating, electron beam heating, flame heating, and the like, and also means heating by which a workpiece is not heated through the heated atmosphere but a part of the workpiece is directly heated.

In the above-described heat treatment method, the calculation formula may be obtained using the following formula (1) as a regression formula.

$$M = M_0 \exp(-kt^n) \quad (1)$$

where $k = A_0 \exp(-E/RT)$, M: area ratio of carbide (%), $M_0$: area ratio of carbide before heat treatment (%), t: heating time (second), $A_0$, E: constant determined by material, R: gas constant, and T: temperature (K).

The area ratio of carbide in steel reflects the state of carbon solid-dissolved in steel. Accordingly, the area ratio of carbide can be employed for accurately predicting the state of carbon solid-dissolved in steel. Therefore, steel of the same kind as that of the workpiece is actually heat-treated and cut to provide a cross section whose area ratio of carbide (carbide of iron mainly consisting of cementite) is examined by experiments. Then, the obtained result is subjected to a regression analysis using the above-described formula (1) as a regression formula, to derive a TTA diagram from the obtained calculation formula, so that the workpiece can be much more reliably provided with desired heat treatment quality.

According to the above-described heat treatment method, the cold section temperature may be a temperature of a portion in the workpiece that comes in contact with a holding member holding the workpiece.

The temperature of the portion in the workpiece that comes in contact with the holding member tends to decrease due to heat conduction to the holding member. Accordingly, it is often appropriate to set the temperature of this portion at the above-described cold section temperature.

According to the above-described heat treatment method, the workpiece may be held in inert gas until quenching is carried out. Accordingly, it becomes possible to suppress formation of an oxide scale in the workpiece, so that an excellent external appearance of the workpiece can be maintained.

In the above-described heat treatment method, the high energy heating may be high-frequency induction heating. By high-frequency induction heating, the heated state of the workpiece made of steel can be relatively readily controlled. Accordingly, high-frequency induction heating is suitable as high energy heating employed in the present invention.

According to the above-described heat treatment method, preferably, in the step of determining quenching timing for the workpiece, the quenching timing for the workpiece is determined assuming that solid dissolution of carbon in a base material is started in the steel at a point of time when exceeding a heating transformation point determined based on a relation with a temperature rising rate.

When steel is heated, solid dissolution of carbon in the base material of steel is started at the point of time when exceeding an $A_1$ transformation point corresponding to an austenitizing temperature. In the case where steel is continuously heated, however, steel is austenitized at the point of time when exceeding the heating transformation point (an $A_{c1}$ transformation point) higher than the $A_1$ transformation point. Then, when the temperature rising rate (a rise in the temperature per unit time) is increased, the difference between the $A_1$ transformation point and the $A_{c1}$ transformation point is increased. Accordingly, the quenching timing is determined assuming that solid dissolution in a base material is started at the point of time when exceeding the heating transformation point. Thereby, the workpiece can be further more reliably provided with desired heat treatment quality.

The above-described heat treatment method may include the steps of: quench-hardening a workpiece made of steel by the heat treatment method; storing an electric power pattern showing a transition of electric power with respect to passage of time given to the workpiece in the step of quench-hardening a workpiece; and quench-hardening another workpiece that is identical in shape and material quality to the workpiece in accordance with the stored electric power pattern.

In this way, the electric power pattern obtained at the time when performing quench-hardening by the above-described heat treatment method is stored, and then, another workpiece having the same shape and the same material quality is quench-hardened in the electric power pattern. Accordingly, the heat treatment method of the present invention as described above is used only for determining the condition of heat treatment (determining the electric power pattern), and after that, the workpiece can be heat-treated based on the determined electric power pattern. Thereby, even when temperature measurement is performed using a radiation thermometer having a measurement accuracy that deteriorates, for example, due to continuous use, heat treatment can be continuously carried out while suppressing the influence of measurement accuracy deterioration.

A method of manufacturing a machine part according to the present invention includes the steps of: preparing a steel member formed in a shape of the machine part; and quench-hardening the steel member. Then, in the step of quench-hardening the steel member, the steel member is quench-hardened by the heat treatment method of the present invention as described above.

In this way, by employing the heat treatment method of the present invention in the method of manufacturing a machine part, it becomes possible to manufacture a machine part more reliably provided with desired heat treatment quality while employing high energy heating.

Advantageous Effects of Invention

As apparent from the above description, according to the heat treatment method and the method of manufacturing a machine part of the present invention, it becomes possible to provide: a heat treatment method by which a workpiece made of steel can be more reliably provided with desired heat treatment quality in the quench-hardening process of the workpiece by improving the prediction accuracy of the heat treatment quality; and a method of manufacturing a machine part using this heat treatment method.

DESCRIPTION OF EMBODIMENTS

Figure 1:
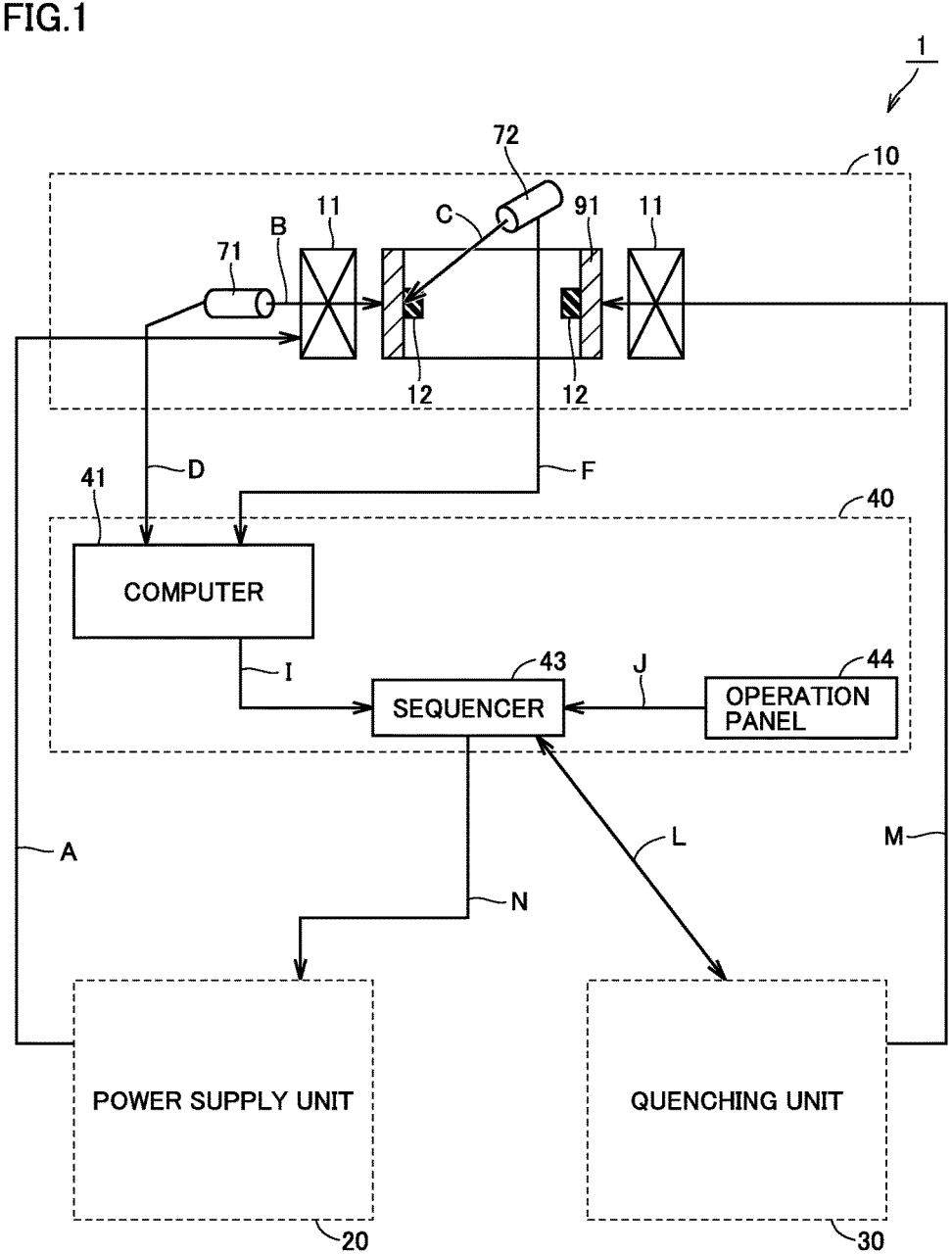
FIG. 1 is a schematic diagram showing the configuration of a heat treatment apparatus.

The embodiments of the present invention will be hereinafter described with reference to the accompanying drawings, in which the same or corresponding components are designated by the same reference characters, and description thereof will not be repeated.

First, the configuration of a heat treatment apparatus used in one embodiment of the present invention will be hereinafter described. Referring to FIG. 1, a high-frequency quenching apparatus 1 serving as a heat treatment apparatus of the present invention includes: a heating unit 10; a power supply unit 20 connected to heating unit 10 and supplying electric power to heating unit 10; a quenching unit 30 spraying cooling water as a coolant on a workpiece 91 heated within heating unit 10 to rapidly cool workpiece 91, thereby quench-hardening workpiece 91; a control unit 40 connected to heating unit 10, power supply unit 20 and quenching unit 30, and controlling these units; a first radiation thermometer 71 as the first thermometer measuring a hot section temperature of the workpiece; and a second radiation thermometer 72 as the second thermometer measuring a cold section temperature of the workpiece.

Power supply unit 20 includes, for example, a power receiving panel, a transformer, an inverter, a matching device, and the like. Quenching unit 30 includes, for example, a temperature adjustment heater adjusting the temperature of a coolant such as cooling water, a tank storing cooling water, a pump feeding cooling water from the tank to heating unit 10, and the like.

Heating unit 10 includes an annular coil 11 and a holding member 12 holding workpiece 91 in a region surrounded by coil 11. Coil 11 is connected to power supply unit 20 and serves to induction-heat workpiece 91 made of steel by electric power supplied from power supply unit 20. Workpiece 91 in the present embodiment is a bearing ring of a rolling bearing serving as a machine part that has an annular shape.

In high-frequency quenching apparatus 1 in the present embodiment, coil 11 is arranged so as to face the outer peripheral surface of workpiece 91 serving as a bearing ring. Accordingly, the outer peripheral surface of workpiece 91 results in a region into which the largest amount of magnetic flux comes from coil 11 and in which the highest temperature rise occurs. Accordingly, first radiation thermometer 71 measuring the hot section temperature measures the temperature of the outer peripheral surface of workpiece 91. On the other hand, the inner peripheral surface of workpiece 91 is a region into which the smallest amount of magnetic flux comes from coil 11 and in which a temperature rise by induction heating is the lowest. Furthermore, the inner peripheral surface of workpiece 91 is held by holding member 12. Accordingly, in workpiece 91, the lowest temperature rise occurs in a region of the inner peripheral surface of workpiece 91 that comes in contact with holding member 12. Therefore, second radiation thermometer 72 measuring the cold section temperature measures the temperature of a region in the inner peripheral surface of workpiece 91 that comes in contact with holding member 12. In addition, when holding member 12 holds a region other than the inner peripheral surface of workpiece 91, for example, an end face, second radiation thermometer 72 is arranged so as to measure: the temperature of a region of the end face that comes in contact with holding member 12; and the temperature of a region of the inner peripheral surface of workpiece 91 that exhibits less temperature rise. Furthermore, in the case where it is difficult to measure the temperature of the region of workpiece 91 that comes in contact with holding member 12 using a radiation thermometer, a contact-type thermometer such as a thermocouple may be disposed so as to come in contact with this region, in place of second radiation thermometer 72 or in addition to second radiation thermometer 72. In the case where the temperature of the region in workpiece 91 that comes in contact with holding member 12 is measured by second radiation thermometer 72, a groove, a hole or the like penetrating holding member 12 may be provided in holding member 12 for measuring the temperature of the desired region through the groove, the hole or the like.

Control unit 40 includes a computer 41 such as a personal computer, a sequencer (a programmable controller) 43, and an operation panel 44. Computer 41 is connected to first radiation thermometer 71 and second radiation thermometer 72, and receives temperature information from these radiation thermometers. Furthermore, computer 41 is connected to sequencer 43. To sequencer 43, computer 41 transmits a signal showing the heated state of the outer peripheral surface of workpiece 91 based on the hot section temperature, and also transmits a signal giving an instruction to start quenching based on the hot section temperature and the cold section temperature.

Operation panel 44 is connected to sequencer 43. An operator inputs a heat treatment condition (an electric power pattern) and the like into sequencer 43 through operation panel 44. Sequencer 43 is connected to power supply unit 20 and quenching unit 30. Sequencer 43 transmits an output setting signal and a heating ending signal to power supply unit 20. Furthermore, sequencer 43 receives information about the temperature of cooling water stored in the tank of the quenching unit and transmits a signal for adjusting the temperature of the cooling water to the temperature adjustment heater. Furthermore, sequencer 43 transmits, to a pump of quenching unit 30, a signal giving an instruction to spray cooling water onto workpiece 91.

Hereinafter described will be a process of quench-hardening the entire workpiece 91 using high-frequency quenching apparatus 1 described above, that is, a method of immersion-quenching workpiece 91 and a method of manufacturing a machine part using the quenching method.

According to the method of manufacturing a machine part in the present embodiment, workpiece 91 is first prepared as a steel member formed in the shape of a bearing ring of a rolling bearing serving as a machine part. Specifically, a steel material made of SUJ2 defined by the JIS standards that is, for example, bearing steel is prepared and then processed, thereby preparing workpiece 91.

Then, this workpiece 91 is quench-hardened using high-frequency quenching apparatus 1 described above. Specifically, referring to FIG. 1, workpiece 91 is first held by holding member 12 and thereby set within heating unit 10 of high-frequency quenching apparatus 1. Then, the steps of adjusting the temperature of workpiece 91 and determining the quenching timing for workpiece 91 are concurrently carried out. In the step of adjusting the temperature of workpiece 91, electric power is supplied from power supply unit 20 to coil 11 (an arrow A). This leads to formation of a magnetic field that changes in accordance with the current flowing through coil 11, and then, workpiece 91 is induction-heated by this magnetic field.

At this time, the temperature of the outer peripheral surface that exhibits the highest temperature rise in workpiece 91, that is, the hot section temperature, is measured by first radiation thermometer 71 (an arrow B). Also, the temperature of a region in the inner peripheral surface that exhibits the lowest temperature rise in workpiece 91 and comes in contact with holding member 12, that is, the cold section temperature, is measured by second radiation thermometer 72 (an arrow C).

Heating by induction heating to workpiece 91 is controlled based on the hot section temperature measured by first radiation thermometer 71. Specifically, the information about the hot section temperature measured by first radiation thermometer 71 is analog-digital (AD) converted and transmitted to computer 41 of control unit 40 (an arrow D). Computer 41 transmits, to sequencer 43, a signal showing the heated state of the outer peripheral surface of workpiece 91 based on the information on the hot section temperature (an arrow I). Furthermore, sequencer 43 transmits an output setting signal to power supply unit 20 based on the signal showing the heated state of the outer peripheral surface (an arrow N). Then, based on this output setting signal, electric power is supplied from power supply unit 20 to coil 11 (an arrow A).

In the step of determining the quenching timing for workpiece 91, referring to FIG. 1, the information about each of the hot section temperature measured by first radiation thermometer 71 and the cold section temperature measured by second radiation thermometer 72 is transmitted as measured temperature data to computer 41 (arrows D and F). Then, in computer 41, the quenching timing is determined based on the hot section temperature and the cold section temperature each obtained as measured temperature data such that steel forming workpiece 91 exhibits a predetermined solid-dissolved state of carbon on a TTA diagram in the entire workpiece 91. This TTA diagram is derived by a calculation formula obtained by conducting a regression analysis of the result of an experiment performed in advance for examining the relation between the solid-dissolved state of carbon in steel and each of a heating temperature and a heating time of the steel.

Figure 2:
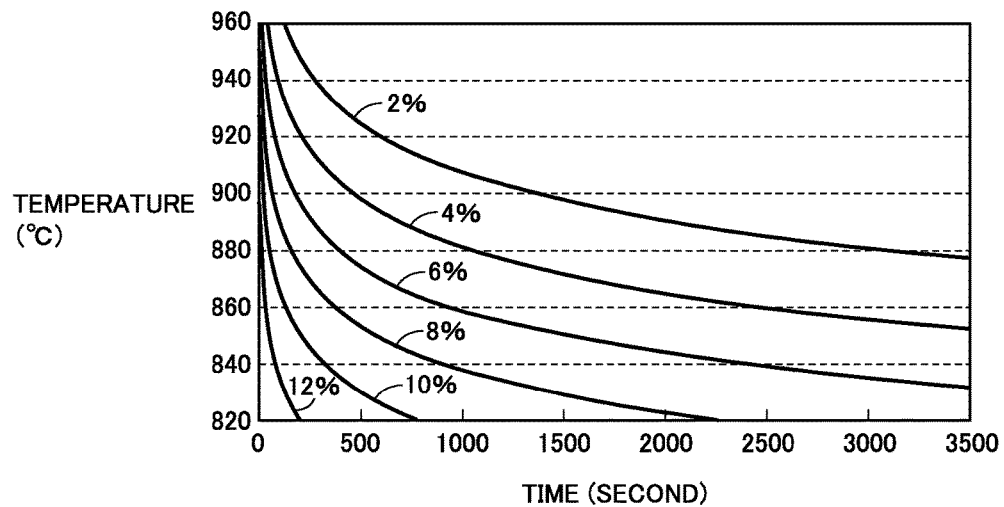
FIG. 2 shows an example of a TTA diagram of an area ratio of carbide produced based on an experiment.

FIG. 2 shows an example of the TTA diagram of the area ratio of carbide produced based on the experiment. More specifically, a test piece made of SUJ2 defined by the JIS standards was prepared and heat-treated on the conditions shown in Table 1. Then, the test piece subjected to heat treatment was cut to prepare a cross section whose carbide area ratio was measured using an electron microscope. Then, the measured area ratio was subjected to a regression analysis using the following formula (1) as a regression formula, and the obtained calculation formula was plotted to prepare FIG. 2. In FIG. 2, the horizontal axis shows a holding time while the vertical axis shows a heating temperature. Also, the curved lines shown in FIG. 2 each show a combination of the holding time and the heating temperature at which the carbide area ratios attain 2%, 4%, 6%, 8%, 10%, and 12%, respectively.

$$M = M_0 \exp(-kt^n) \tag{1}$$

In this case, $k = A_0 \exp(-E/RT)$, M: area ratio of carbide (%), $M_0$: area ratio of carbide before heat treatment (%), t: heating time (second), $A_0$, E: constant determined by material, R: gas constant, and T: temperature (K).

TABLE 1

| +No | Heating Temperature (° C.) | Time (Second) |
|---|---|---|
| 1 | 800 | 10 |
| 2 | | 30 |
| 3 | | 60 |
| 4 | | 300 |
| 5 | | 600 |
| 6 | | 1800 |
| 7 | 850 | 10 |
| 8 | | 30 |
| 9 | | 60 |
| 10 | | 300 |
| 11 | | 600 |

TABLE 1-continued

| +No | Heating Temperature (° C.) | Time (Second) |
|---|---|---|
| 12 |  | 1800 |
| 13 |  | 3600 |
| 14 | 880 | 10 |
| 15 |  | 120 |
| 16 |  | 300 |
| 17 |  | 420 |
| 18 |  | 600 |
| 19 |  | 780 |
| 20 |  | 960 |
| 21 |  | 1200 |
| 22 |  | 1800 |
| 23 | 900 | 10 |
| 24 |  | 30 |
| 25 |  | 45 |
| 26 |  | 60 |
| 27 |  | 100 |
| 28 |  | 150 |
| 29 |  | 200 |
| 30 |  | 250 |
| 31 |  | 300 |
| 32 |  | 600 |
| 33 |  | 1800 |
| 34 | 920 | 10 |
| 35 |  | 30 |
| 36 |  | 45 |
| 37 |  | 60 |
| 38 |  | 90 |
| 39 |  | 120 |
| 40 |  | 300 |
| 41 |  | 1800 |
| 42 | 950 | 10 |
| 43 |  | 30 |
| 44 |  | 60 |
| 45 |  | 300 |
| 46 |  | 600 |
| 47 |  | 1800 |
| 48 | 1000 | 10 |
| 49 |  | 30 |
| 50 |  | 60 |
| 51 |  | 300 |
| 52 |  | 600 |
| 53 |  | 1800 |

The area ratio of carbide in steel can be employed for predicting the state of carbon which is solid-dissolved in steel. Accordingly, FIG. 2 can be used for prediction of the heat treatment quality. A method of determining the quenching timing will be hereinafter described by way of example with reference to the case of determining the quenching timing assuming that 6% to 8% of the carbide area ratio is defined as targeted quenching quality.

Figure 3:
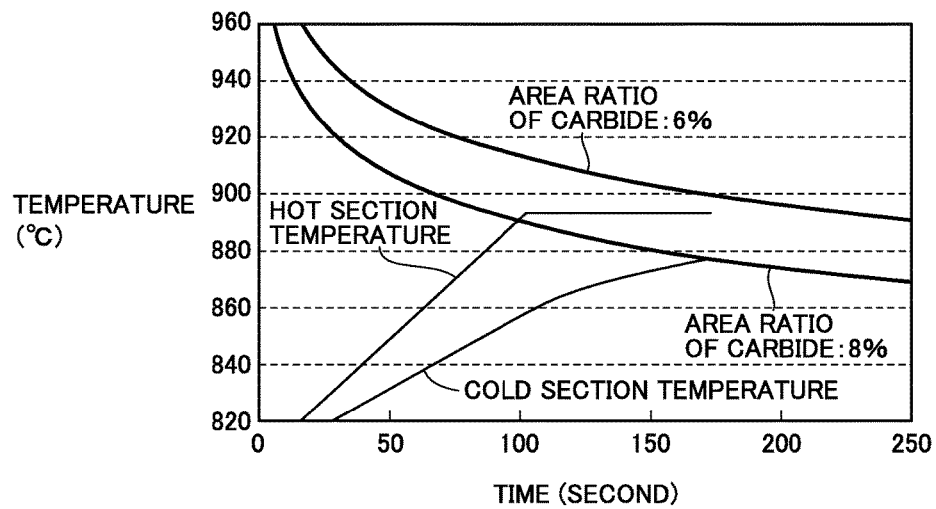
FIG. 3 is a diagram showing the state where transitions of a hot section temperature and a cold section temperature are overlapped with the TTA diagram.

FIG. 3 is a diagram showing the state where transitions of the hot section temperature and the cold section temperature are overlapped with a part of the TTA diagram in FIG. 2. In FIG. 3, quenching is carried out in the state where both of a portion of workpiece 91 in which the hot section temperature is measured (the outer peripheral surface of the workpiece) and a portion of workpiece 91 in which the cold section temperature is measured (the portion in which the workpiece is held by the holding unit) satisfy the condition that the carbide area ratio attains 6% to 8%. Consequently, the entire workpiece 91 is to achieve the desired heat treatment quality. Referring to FIG. 3, as to the hot section temperature, heating is controlled by PID control such that the heating temperature is maintained constant, thereby reaching the condition that the carbide area ratio immediately attains 6% to 8%, that is, a region sandwiched between a curved line showing 6% of the carbide area ratio and a curved line showing 8% of the carbide area ratio (a quenching start region). On the other hand, as compared with the hot section temperature, the cold section temperature requires a relatively longer time period until reaching the condition that the carbide area ratio attains 6% to 8%. Accordingly, even when the hot section temperature reaches the quenching start region, heating is continued until the cold section temperature reaches the quenching start region. Then, quenching is carried out at the point of time when both of the hot section temperature and the cold section temperature come to be located in the quenching start region.

Referring to FIG. 1, the above-described quenching timing is determined by computer 41 based on: the calculation formula determined in advance by a regression analysis of the experimental results; and the transition information on each of the hot section temperature obtained from first radiation thermometer 71 and the cold section temperature obtained from second radiation thermometer 72 after heating of workpiece 91 is started in the state where the targeted heat treatment quality (the carbide area ratio) is input into computer 41. When the quenching start timing is determined, a signal giving an instruction to start quenching is transmitted from computer 41 to sequencer 43 (an arrow I). Sequencer 43 having received the signal for starting quenching transmits a heating ending signal to power supply unit 20, and also transmits a cooling water injection signal to quenching unit 30. Power supply unit 20 having received the heating ending signal stops supplying electric power to coil 11. On the other hand, quenching unit 30 having received the cooling water injection signal employs a pump to spray, onto workpiece 91, the cooling water stored in the tank and adjusted to an appropriate temperature by the temperature adjustment heater. Thereby, heating of workpiece 91 by coil 11 is stopped while workpiece 91 is rapidly cooled by cooling water.

By the above-described procedure, the immersion quenching process for workpiece 91 in the present embodiment is completed. In the immersion quenching process in the present embodiment, induction heating of workpiece 91 is controlled based on the hot section temperature. This leads to suppression of defects such as coarsening of a crystal grain due to heating of a part of workpiece 91 to an elevated temperature more than necessary. Furthermore, in the immersion quenching process in the present embodiment, quenching timing for workpiece 91 is determined based on both of the hot section temperature and the cold section temperature such that steel forming workpiece 91 exhibits a predetermined solid-dissolved state of carbon on the TTA diagram in the entire workpiece 91. Accordingly, the desired heat treatment quality is achieved in the entire workpiece 91. Also, the TTA diagram is derived by a calculation formula obtained by conducting a regression analysis of the result of an experiment performed in advance for examining the relation between the solid-dissolved state of carbon in steel of the same kind as steel forming workpiece 91 and each of the heating temperature and the heating time of the steel. Thereby, the material quality can be predicted with high accuracy as compared with the conventional method of approximately calculating the distribution of the amount of carbon solid-dissolved in steel based on a simple calculation model.

As described above, according to the immersion quenching process in the present embodiment, workpiece 91 can be more reliably provided with desired heat treatment quality by improving the prediction accuracy of the heat treatment quality.

In the immersion quenching process in the above-described present embodiment, it is preferable that workpiece 91 is held in an inert gas atmosphere until quenching is carried out. Specifically, referring to FIG. 1, heating unit 10 is filled with inert gas such as nitrogen and argon, thereby allowing suppression of production of an oxide scale in workpiece 91, so that the external appearance with excellent quality can be maintained.

Furthermore, according to the immersion quenching process in the present embodiment, in the step of determining the quenching timing for workpiece 91, the quenching timing for workpiece 91 is determined assuming that solid dissolution of carbon in a base material is started in steel at the point of time when exceeding the heating transformation point determined based on the relation with the temperature rising rate.

Figure 4:
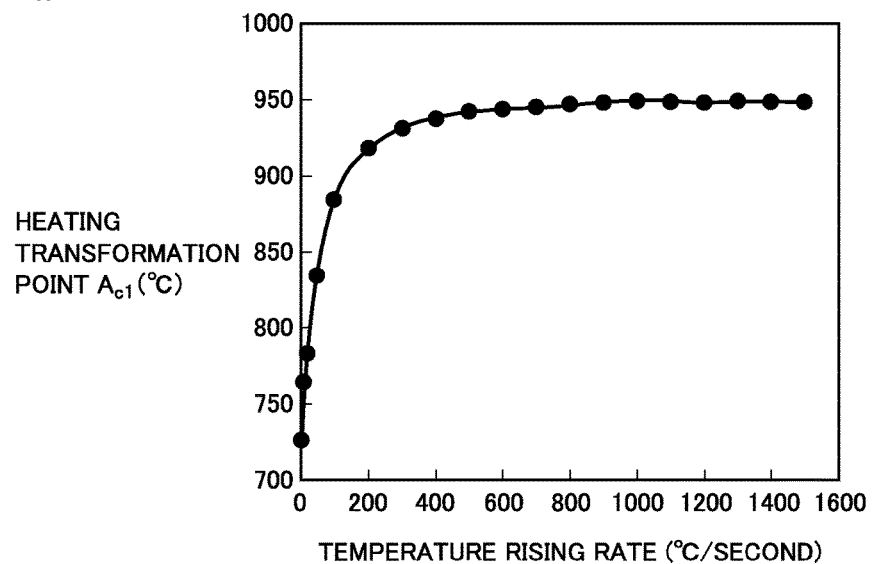
FIG. 4 is a diagram showing the relation between a temperature rising rate and a heating transformation point.

The solid solubility limit of carbon in ferrite is relatively low. Accordingly, solid dissolution of carbon during heating before quenching is started at the point of time when iron in steel is substantially austenitized, that is, started at the temperature at which steel is austenitized. Then, the austenitizing temperature of steel changes in accordance with the temperature rising rate of steel. Particularly in the case where the temperature rising rate is relatively high as in the case of high-frequency induction heating, the difference between the $A_1$ transformation point that is a common austenitizing temperature and the actual austenitizing temperature (the heating transformation point; $A_{c1}$ transformation point) is increased. Accordingly, in the immersion quenching process in the present embodiment, the quenching timing for workpiece 91 is determined assuming that solid dissolution of carbon in a base material is started at the point of time when exceeding the heating transformation point. More specifically, the relation between the temperature rising rate and the heating transformation point of the material forming workpiece 91 is examined in advance. FIG. 4 shows an example of the relation between the temperature rising rate and the heating transformation point of steel forming workpiece 91. As shown in FIG. 4, in the range in which the temperature rising rate is equal to or lower than 300° C., the heating transformation point rises abruptly as the temperature rising rate increases, and after that, the temperature rising rate gently increases. In the present embodiment, based on the relation shown in FIG. 4, the heating transformation point is derived from the heat pattern (heating history) of workpiece 91 measured by first radiation thermometer 71 and second radiation thermometer 72, based on which the quenching timing can be determined.

Furthermore, the above-described formula (1) is for predicting the area ratio of carbide in the case where the temperature is maintained at a constant temperature for a predetermined time period. On the other hand, in the immersion quenching process of the present embodiment, the temperature changes continuously with respect to the heating time. Accordingly, as to the carbide area ratio in the present embodiment, a heat pattern is divided into infinitesimal times, each carbide area ratio is calculated assuming that the temperature is maintained at a constant temperature during each of these infinitesimal times, and the calculated carbide area ratios are integrated, thereby predicting the carbide area ratio. A specific method will be hereinafter described with reference to FIGS. 5 and 6.

Figure 5:
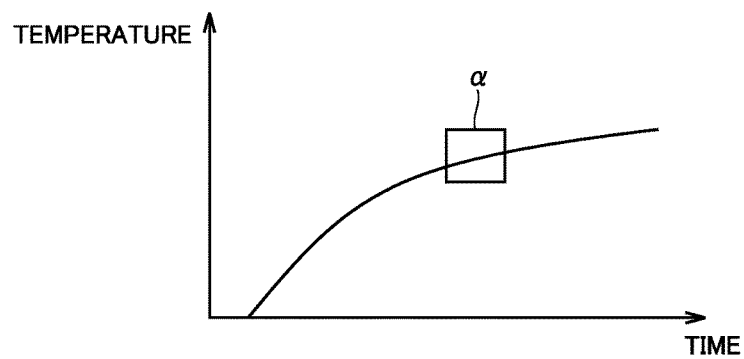
FIG. 5 is a diagram showing an example of a transition of a temperature (a heat pattern) with respect to passage of time.
Figure 6:
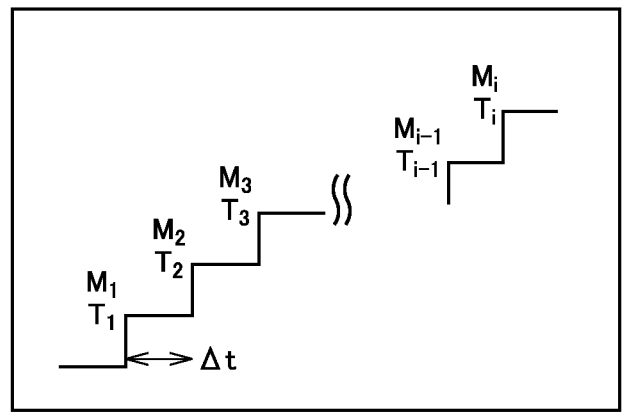
FIG. 6 is a diagram for illustrating a method of integrating changes in carbide area ratio with heat patterns divided in infinitesimal times.

FIG. 5 shows an example of the heat pattern of the workpiece in the immersion quenching process of the present embodiment. Furthermore, FIG. 6 is an enlarged view of a region α in FIG. 5 for illustrating the calculation method of the area ratio of carbide. Referring to FIGS. 5 and 6, in the case where the heat pattern of workpiece 91 is as shown in FIG. 5, for example, the heat pattern in region α is divided in each infinitesimal time Δt as shown in FIG. 6 to calculate the area ratio of carbide. Specifically, area ratios $M_1$, $M_2$ and $M_3$ . . . of carbide held for time Δt at temperatures $T_1$, $T_2$ and $T_3$, respectively, are calculated according to the following formula (2) and then integrated, so that the final carbide area ratio can be derived.

[Formula 1]

$$M_i = M_0 \exp(-k(t^*_{i-1} + \Delta t)^n) \qquad (2)$$

$$t^*_i = \sqrt[n]{\ln\left(\frac{M_0}{M_i}\right) \times \left[A_0 \exp\left(\frac{-E}{RT}\right)\right]^{-n}}$$

Furthermore, in the case where the radiation thermometer is continuously used, the measurement accuracy may decrease, thereby causing an adverse effect on the prediction accuracy of the heat treatment quality. Accordingly, in the case where a number of workpieces having the same shape and the same material quality are subjected to a quench-hardening process in the immersion quenching process of the present embodiment, it may be possible to employ a process of: quench-hardening workpiece 91 in the above-described procedure; storing the electric power pattern obtained at that time in a storage device; and quench-hardening another workpiece having the same shape and the same material quality as those of workpiece 91 in accordance with the stored electric power pattern.

Specifically, referring to FIG. 1, after workpiece 91 is subjected to the quenching process as described above, for example, the electric power pattern and the quenching timing that are applied to workpiece 91 are stored in sequencer 43. Then, another workpiece having the same shape and the same material quality as those of workpiece 91 is placed in heating unit 10, and the electric power pattern and the quenching timing stored in sequencer 43 are called using operation panel 44. Then, sequencer 43 transmits, to power supply unit 20, an output setting signal so as to provide coil 11 with electric power in accordance with the called electric power pattern. Thereby, such another workpiece is heated in the same heat pattern as that of workpiece 91 previously subjected to heat treatment. On the other hand, sequencer 43 transmits, to quenching unit 30, a cooling water injection signal so as to spray a coolant onto another workpiece in accordance with the called quenching timing. Thereby, such another workpiece is rapidly cooled in the same timing as that for workpiece 91 previously subjected to heat treatment, and then quench-hardened. Since this eliminates the need to continuously use a radiation thermometer, it becomes possible to suppress occurrence of a problem that the prediction accuracy of the heat treatment quality deteriorates due to continuous use of a radiation thermometer.

Examples

Figure 7:
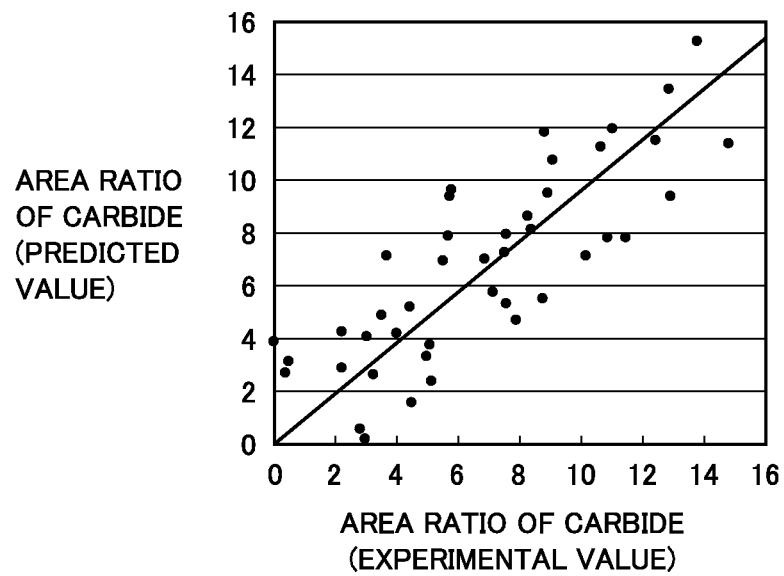
FIG. 7 is a diagram showing the relation between a predicted value and an actual measured value of the carbide area ratio in the case where quenching is performed by the conventional method.
Figure 8:
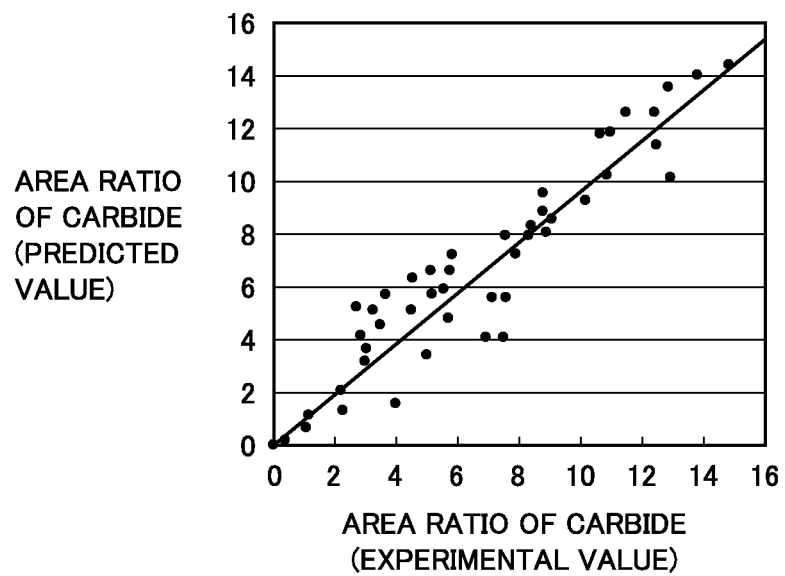
FIG. 8 is a diagram showing the relation between the predicted value and the actual measured value of the carbide area ratio in the case where quenching is performed by the method of the present invention.

In order to confirm the superiority of the heat treatment method of the present invention, a steel member was subjected to an immersion quenching process in accordance with the conventional method and the method of the present invention, to examine the relation between the predicted value (target value) and the experimental value (actual measured value) of the carbide area ratio. Specifically, a steel member was prepared and subjected to immersion quenching so as to achieve various carbide area ratios. Then, the steel member subjected to the quenching process was cut to obtain a cross section, which was then etched with an appropriate etching solution. Then, carbide was observed with a microscope and the area ratio thereof was calculated. As a method of immersion quenching, two types of methods were employed including: the conventional method using a model disclosed in PTD 1 in which carbon is diffused from two carbides while being solid-dissolved in a base material; and the method of the present invention described in the above-described embodiment. Then, the results of both methods were compared. FIG. 7 shows the relation between the experimental value and the predicted value according to the conventional method. FIG. 8 shows the relation between the experimental value and the predicted value according to the method of the present invention.

As apparent form FIGS. 7 and 8, in the method of the present invention, variations are reduced distinctly so that the actual measured value closer to the predicted value is achieved as compared with the conventional method. Based on this, it is confirmed that the heat treatment method of the present invention allows the prediction accuracy of the heat treatment quality to be improved so that a workpiece can be more reliably provided with desired heat treatment quality, as compared with the conventional method.

Although an explanation has been given in the above-described embodiment and example with regard to the case where high-frequency induction heating is employed as high energy heating, the heat treatment method and the method of manufacturing a machine part according to the present invention are not limited thereto, but can be carried out utilizing other high energy heating such as laser heating, electron beam heating, and flame heating.

It should be understood that the embodiments and examples disclosed herein are illustrative and non-restrictive in every respect. The scope of the present invention is defined by the terms of the claims, rather than the description above, and is intended to include any modifications within the meaning and scope equivalent to the terms of the claims.

INDUSTRIAL APPLICABILITY

The heat treatment method and the method of manufacturing a machine part according to the present invention can be particularly advantageously applied to a heat treatment method and a method of manufacturing a machine part that are required to accurately provide desired heat treatment quality.

REFERENCE SIGNS LIST

1 high-frequency quenching apparatus, 10 heating unit, 11 coil, 12 holding member, 20 power supply unit, 30 quenching unit, 40 control unit, 41 computer, 43 sequencer, 44 operation panel, 71 first radiation thermometer, 72 second radiation thermometer, 91 workpiece.

The invention claimed is:

1. A heat treatment method of quench-hardening a workpiece made of steel having a solid-dissolved state of carbon within a desired range, said quench-hardening method comprising the steps of:
measuring a hot section temperature corresponding to a temperature of a portion in which the temperature rises most in said workpiece;
measuring a cold section temperature corresponding to a temperature of a portion in which the temperature rises least in said workpiece;
adjusting the temperature of said workpiece;
determining quenching timing for said workpiece; and
quench-hardening said workpiece according to said quenching timing to obtain said workpiece having said solid-dissolved state of carbon within said desired range,
said step of adjusting the temperature of said workpiece including the steps of
heating said workpiece, and
controlling heating of said workpiece by said heating based on said hot section temperature and said cold section temperature such that said hot section temperature and said cold section temperature reach quenching temperatures determined according to a TTA diagram,
in said step of determining quenching timing for said workpiece,
said quenching timing being determined based on said hot section temperature and said cold section temperature such that said steel forming said workpiece exhibits a predetermined solid-dissolved state of carbon on said TTA diagram in entire said workpiece, and
said TTA diagram being derived by a calculation formula obtained by conducting a regression analysis of a result of an experiment performed in advance for examining a relation between said solid-dissolved state of carbon in said steel and each of a heating temperature and a heating time of said steel,
wherein said calculation formula is obtained using a formula (1) described below as a regression formula:

$$M = M_0 \exp(-kt^n) \quad (1)$$

where $k = A_0 \exp(-E/RT)$, M: area ratio of carbide (%), $M_0$: area ratio of carbide before heat treatment (%), t: heating time (second), $A_0$, E: constant determined by material, R: gas constant, and T: temperature (K).

2. The heat treatment method according to claim 1, wherein said cold section temperature is a temperature of a portion in said workpiece that comes in contact with a holding member holding said workpiece.

3. The heat treatment method according to claim 1, wherein said workpiece is held in inert gas until quenching is carried out.

4. The heat treatment method according to claim 1, wherein said heating is high-frequency induction heating.

5. The heat treatment method according to claim 1, wherein, in said step of determining quenching timing for said workpiece, the quenching timing for said workpiece is determined assuming that solid dissolution of carbon in a base material is started in said steel at a point of time when exceeding a heating transformation point determined based on a relation with a temperature rising rate.

6. A heat treatment method comprising the steps of:
quench-hardening a workpiece made of steel by the heat treatment method according to claim 1;
storing an electric power pattern showing a transition of electric power with respect to passage of time given to said workpiece in said step of quench-hardening a workpiece; and
quench-hardening another workpiece made of steel that is identical in shape to said workpiece in accordance with said electric power pattern stored.

7. A method of manufacturing a machine part, said method comprising the steps of:
preparing a steel member formed in a shape of the machine part; and
quench-hardening said steel member, in said step of quench-hardening said steel member, said steel member being quench-hardened by the heat treatment method according to claim 1.

8. The heat treatment method according to claim 1, wherein said heating is laser heating, electron beam heating or flame heating.

* * * * *